United States Patent Office 3,037,021
Patented May 29, 1962

3,037,021
NOVEL PROCESS FOR THE PREPARATION OF AN 11,18-OXYGENATED STEROID AND PRODUCTS RESULTING THEREFROM
Georges Muller, Nogent-sur-Marne, and Roland Bardoneschi, Tremblay-les-Conesses, France, assignors, by mesne assignments, to Roussel-UCLAF, S.A., Paris, France, a corporation of France
No Drawing. Filed June 27, 1960, Ser. No. 38,721
Claims priority, application France Aug. 10, 1959
5 Claims. (Cl. 260—239.57)

This invention relates to a novel process for the preparation of an 11,18-oxygenated steroid. It more particularly relates to a process for producing the 18,11-lactone of 11β-hydroxy-Δ⁴-pregnene-3,20-dione-18-oic acid of the formula:

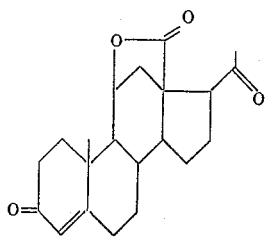

and to the intermediate products resulting from the novel process:

The 3α-hydroxy-5β-pregnane-11,20-dione-18-oic acid and its hydroxy lactone tautomer, The 18,11-lactone of 3α,11β,20β-trihydroxy-5β-pregnane-18-oic acid, The 18,11-lactone of 11β-hydroxy-5β-pregnane-3,20-dione-18-oic acid, The 18,11-lactone of 4 ϛ-bromo-11β-hydroxy-5β-pregnane-3,20-dione-18-oic acid.

In a copending application, commonly assigned, Serial No. 38,722 filed June 27, 1960, entitled "11,18-Oxido Steroids and the Process for Their Preparation," a process for the preparation of an intermediate of the first stages in the synthesis of aldosterone was described, namely 11β,18-oxido-5β-pregnane-3,20-dione of the formula

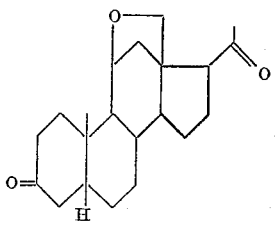

starting from 3α-acetoxy-18,20β-oxido-5β-pregnane-11-one, which itself is derived from a derivative of the bile acid series, thereby providing a passage from this series to aldosterone.

The present invention provides a method for the direct preparation, beginning with the same starting material as in the copending application, of an important but more advanced intermediate in the synthesis of the hormone in question, i.e. aldosterone. This intermediate is the 18,11-lactone of 11β-hydroxy-Δ⁴-pregnene-3,20-dione-18-oic acid, described by J. Schmidlin et al., Exper., 11, 365 (1955), and by E. Vischer et al., Exper., 12, 50 (1956), but obtained in another, non-industrial manner.

It is therefore an object of this invention to provide a process for producing the 18,11-lactone of 11β-hydroxy-Δ⁴-pregnene-3,20-dione-18-oic acid.

A further object of the invention is the production of the novel intermediate compounds:

The 3α-hydroxy-5β-pregnane-11,20-dione-18-oic acid and its hydroxy lactone isomer.

The 18,11-lactone of 3α,11β,20β-trihydroxy-5β-pregnane-18-oic acid,

The 18,11-lactone of 11β-hydroxy-5β-pregnane-3,20-dione-18-oic acid,

The 18,11-lactone of 4 ϛ-bromo-11β-hydroxy-5β-pregnane-3,20-dione-18-oic acid.

These and other objects of the invention will become apparent as the description thereof proceeds.

The process for the preparation of the 18,11-lactone of 11β-hydroxy-Δ⁴-pregnene-3,20-dione-18-oic acid and the sequence of reactions are summarized in the schematic flow sheet of Table I.

TABLE I

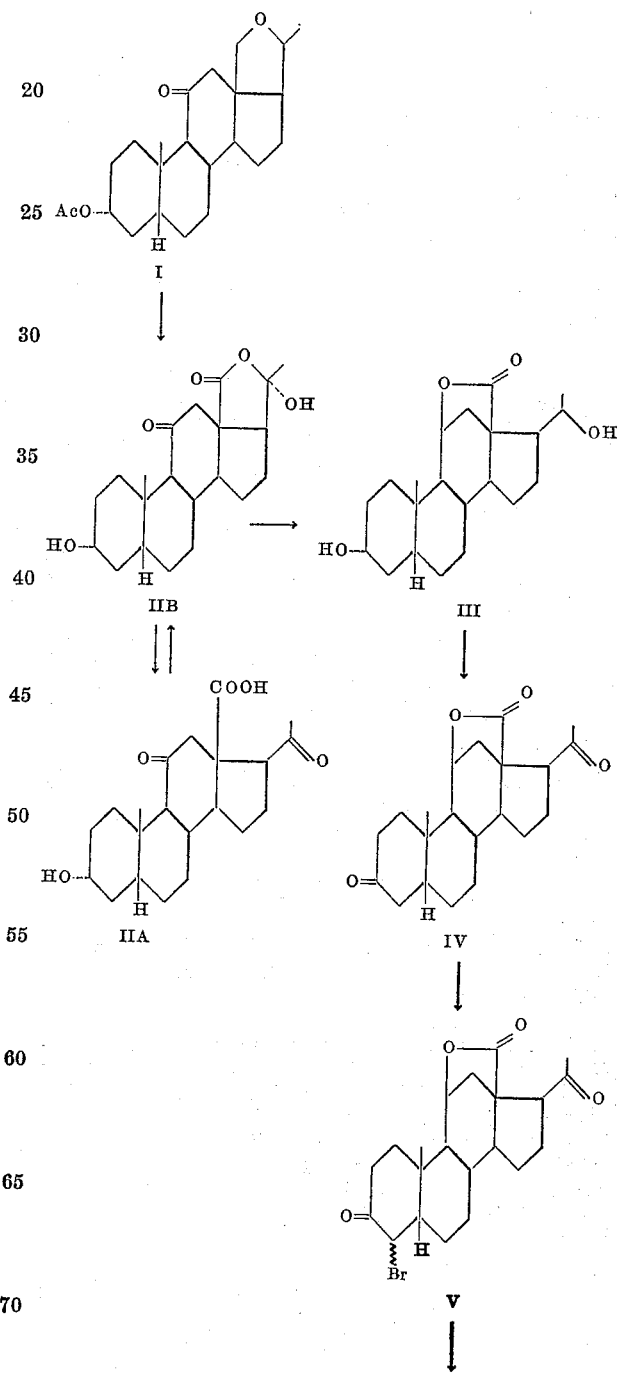

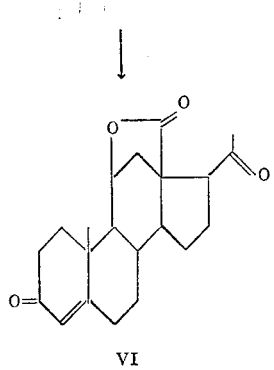

VI

These reactions consist essentially of:

(a) Oxidizing, with subsequent saponification, 3α-acetoxy-18,20-β-oxido-5β-pregnane-11-one, I, in such a manner as to obtain the 3α-hydroxy-5β-pregnane-11,20-dione-18-oic acid, IIA, which is conveniently isolated in the form of the hydroxy lactone isomer IIB, 20β,18-lactone of 3α,20α,20β, trihydroxy-5β-pregnane-11-one-18-oic-acid.

(b) Transforming the hydroxy lactone IIB thus obtained by reduction into the 18,11-lactone of 3α,11β,20β-trihydroxy-5β-pregnane-18-oic acid, III, (c) Oxidizing the hydroxyl groups in the 3- and 20-positions of the 18,11-lactone of 3α,11β,20β-trihydroxy-5β-pregnane-18-oic acid, III, which furnishes the 18,11-lactone of 11β-hydroxy-5β-pregnane-3,20-dione-18-oic acid, IV, (d) Substituting the last compound with bromine in the 4-position and (e) Then dehydrobrominating the brominated derivative V, which leads to the desired 18,11-lactone of 11β-hydroxy-Δ⁴-pregnene-3,20-dione-18-oic acid, VI.

Within the scope of this general definition of the process, the various stages which constitute the invention may advantageously be executed in the following manner:

The oxidation of 3α-acetoxy-18,20β-oxido-5β-pregnane-11-one is effected with a sulfochromic mixture, i.e., a mixture of sulfuric acid and chromic acid anhydride in the presence of an inert organic solvent such as acetic acid, followed by a treatment with alkali metal hydroxides. Then in the second stage, an alkali metal borohydride in the presence of an inert organic solvent such as ethanol is used as the reducing agent at reflux temperatures to transform the hydroxy lactone IIB into the 18,11-lactone of 3α,11β,20β-trihydroxy-5β-pregnane-18-oic acid, III. Then Compound III is oxidized with the aid of chromic acid anhydride in solution in acetic acid or with a sulfochromic mixture in the presence of inert organic solvents such as methylene chloride and acetic acid. The following stage of the process, that is the introduction of the bromine into the 4-position of Compound IV, is carried out in the presence of an inert organic solvent such as dimethyl formamide with the aid of bromine in acetic acid. The final dehydrobromination is effected by means of a mixture of lithium bromide and lithium carbonate in the presence of an inert organic solvent such as dimethyl formamide at reflux temperatures.

The starting material for the invention, 3α-acetoxy-18,20β-oxido-5β-pregnane-11-one, I, may be prepared by oxidizing the 3-monoacetate of 5β-pregnane-3α,20β-diol-11-one by lead tetraacetate while heating to reflux in benzene, pouring the reaction mixture in an aqueous solution of sodium iodide, adding to the mixture sodium hyposulfite until the mixture is decolorized, isolating the raw oxidation product and purifying this last by chromatography on alumina.

The following examples are given to make the invention better understood and enable persons skilled in the art to better practice the invention and is not intended to be limitative. The melting points are instantaneous melting points determined on a Kofler block. The temperatures are indicated in degrees centigrade.

*Example I*

PREPARATION OF 3α-ACETOXY-18,20β-OXIDO-5β-PREGNANE-11-ONE 5 grams of the 3-monoacetate of 5β-pregnane-3α,20β-diol-11-one, M.P. 204° C. were introduced into 200 cc. of benzene. 10 cc. of solvent were distilled off, 10 grams of lead tetraacetate were added and the mixture was refluxed for 16 hours. It was poured into 200 cc. of water containing 10 grams of sodium iodide and solid sodium hyposulfite was added until the mixture was decolorized. The mixture was decanted and extracted with ether. The ether extracts were separated, combined, washed with water, with sodium bicarbonate, dried over magneesium sulfate and evaporated to dryness under vacuum. 6 grams of a resin were recovered which were chromatographed on 150 grams of neutral alumina. Elution was effected with petroleum ether containing 2% of methylene chloride. There was obtained 3.31 grams of a resin which on crystallization from petroleum ether furnished 1.42 grams of 3α-acetoxy-18,20β-oxido-5β-pregnane-11-one, having a melting point of 168° C. and a specific rotation $[\alpha]_D^{20} = +67° \pm 5 (CHCl_3)$ The product which has not yet been described is present in the form of small, colorless crystals, insoluble in water, soluble in alcohol, ether, acetone, benzene and chloroform, poorly soluble in petroleum ether.

*Analysis.*—$C_{23}H_{34}O_4$; molecular weight=374.50. Calculated: C, 73.76%; H, 9.15%; O, 17.09%. Found: C, 73.8%; H, 9.2; O, 17.5%.

*Example II*

PREPARATION OF THE 18,11-LACTONE OF 11β-HYDROXY-Δ⁴-PREGNENE-3,20-DIONE-18-OIC-ACID, VI (a) *Hydroxylactone IIB.*—1 gm. of 3α-acetoxy-18,20β-oxido-5β-pregnane-11-one, I, obtained by oxidation of 3α-acetoxy-20β-hydroxy-5β-pregnane-11-one with lead tetra-acetate according to the process described above, was dissolved in 10 cc. acetic acid. To this solution of Compound I, 3.2 cc. of 24% aqueous sulfochromic solution (containing 24 gm. chromic acid anhydride and 37 gm. sulfuric acid per 100 cc. of solution) were added while agitating. The reaction mixture was agitated for two hours at room temperature. Thereafter, it was poured into water, and the aqueous mixture was extracted with chloroform containing 25% ethanol. The extract solutions were washed with sodium hydroxide and with water. The alkaline phases were then acidified with hydrochloric acid, extracted with ether, washed and evaporated to dryness. There was obtained the hydroxylactone IIB which crystallized from ether after a few days, melting point 230° C. For analysis, the product was recrystallized from a mixture of acetone and ether, melting point 232° C., specific rotation $[\alpha]_D^{20} = +34° \pm 5° (c=0.5\%$ ethanol)

Compound 20β,18-lactone of 3α, 20α,20β, trihydroxy-5β-pregnane-11-one-18-oic acid, IIB was obtained in the form of colorless needles which were soluble in alcohol, acetone and dilute aqueous alkalis, very slightly soluble in ether and chloroform and insoluble in water and dilute aqueous acids.

*Analysis.* — $C_{21}H_{30}O_5$=362.45. C a l c u l a t e d: C, 69.58%; H, 8.34%. Found: C, 69.8%; H, 8.3%.

The infra-red spectrum indicates the existence of a hydroxyl group, an unconjugated ketone group and a lactone group, and confirms the hydroxylactone IIB structure of the product obtained thereby.

(b) *The 18,11-lactone of 3α,11β,20β-trihydroxy-5β-pregnane-18-oic acid, III.*—1.04 gm. of the hydroxylactone of the formula 20β, 18-lactone of 3α,20α,20β, trihydoxy-5βrpregnane-11-one-18-oic acid, IIB, melting point 230°, were introduced into 21 cc. ethanol containing 20% water, 1.04 gm. of potassium borohydride were added and the mixture was refluxed for four hours. Thereafter the reaction mixture was acidified with hydrochloric acid to pH 1, 40 cc. water were added and the mixture was vacuum filtered. The filter cake was washed with water and with acetone and after drying yielded compound 18,11-lactone of $3\alpha,11\beta,20\beta$-trihydroxy-$5\beta$-pregnane-18-oic acid, III, melting point about 310° C., specific rotation $[\alpha]_D^{20}=+54°\pm10°$ (c.=0.16% ethanol). It was very slightly soluble in alcohol, ether, acetone, benzene and chloroform, and insoluble in water and dilute aqueous acids or alkalis; it is obtained in the form of hexagonal crystals.

Analysis.—$C_{21}H_{32}O_4$=348.47. Calculated: C, 72.38%; H, 9.26%. Found: C, 72.4%; H, 9.2%.

The infra-red spectrum confirms the existence of a lactone and a hydroxyl group.

The product is not described in the literature.

(c) *The 18,11-lactone of 11$\beta$-hydroxy-5$\beta$-pregnane-3, 20-dione-18-oic acid, IV.*—1.65 gm. of lactone, the 18,11-lactone of $3\alpha,11\beta,20\beta$-trihydroxy-$5\beta$-pregnane-18-oic acid, III were admixed with 16 cc. methylene chloride, 16 cc. acetic acid and 16 cc. of a 9.4% chromic acid solution in acetic acid. The mixture was agitated at room temperature for a few minutes. During this time dissolution took place and then a gummy precipitate was formed which was redissolved by adding 6.6 cc. water. After agitating for one hour, 16 cc. methanol were added. The solution was concentrated in vacuo, and then 60 cc. water were added. The mixture was vacuum filtered. The filter cake was washed with water and dried at 100° C. Product 18,11-lactone of 11$\beta$-hydroxy-5$\beta$-pregnane-3,20-dione-18-ioc acid, IV was recovered, melting point 242° C., which was directly usable in the subsequent stage of the synthesis. For analysis, the product was recrystallized from a mixture of methylene chloride and ether, melting point 246° C., specific rotation $[\alpha]_D^{20}=+55°\pm5°$ (c.=0.5%, chloroform). The product was obtained in the form of large colorless plates which are soluble in alcohol, acetone, benzene and chloroform, very slightly soluble in ether and insoluble in water and dilute aqueous acids or alkalis.

Analysis.—$C_{21}H_{28}O_4$=344.44. Calculated: C, 73.22%; H, 8.19%. Found: C, 73.4%; H, 8.2%.

The infra-red spectrum indicates the presence of two non-conjugated ketone groups and one $\gamma$-lactone group.

This product is not described in the literature.

(d) *The 18,11-lactone of 4$\xi$-bromo-11$\beta$-hydroxy-5$\beta$-pregnane-3,20-dione-18-oic acid, V.*—680 mg. of the 18,11-lactone of 11$\beta$-hydroxy-5$\beta$-pregnane-3,20-dione-18-oic acid, IV, were admixed with 6.8 cc. dimethyl formamide containing one drop of a 35% solution of hydrobromic acid in acetic acid. Thereafter, the mixture was brominated at a temperature of 40° C. with 3.8 cc. of 10% solution of bromine in acetic acid. After fifteen minutes, the reaction mixture was poured into water and the aqueous mixture was extracted with methylene chloride. The extract solutions were washed with water, dried and evaporated to dryness. The residue, consisting of compound 18,11-lactone of 4$\xi$-bromo-11$\beta$-hydroxy-5$\beta$-pregnane-3,20-dione-18-oic acid, V, crystallized from a mixture of ethyl acetate and ether (4:6), melting point 220 to 230° C.

Recrystallization from a mixture of acetone and ether yielded a sample of the pure product, melting point 220 to 230° C., specific rotation $[\alpha]_D^{20}=+67°\pm5°$ (c.=0.5%, chloroform). It was obtained in the form of hexagonal crystals which are soluble in acetone and chloroform, slightly soluble in alcohol and somewhat less soluble in ether, and insoluble in water and dilute aqueous acids or alkalis.

Analysis.—$C_{21}H_{27}O_4Br$ = 423.35. Calculated: C, 59.57%; H, 6.43%; O, 15.12%; Br, 18.9%. Found: C, 59.3%; H, 6.3%; O, 15.1%; Br, 19.3%.

The infra-red spectrum shows the presence of a $\gamma$-lactone group, a non-conjugated ketone function and a ketone group with an equatorial bromine on the carbon atom adjacent to the ketone group or in the $\alpha$-position.

This product is not described in the literature.

(e) *The 18,11-lactone of 11$\beta$-hydroxy-$\Delta^4$-pregnene-3, 20-dione-18-oic acid, VI.*—300 mg. of dry lithium carbonate, 150 mg. of anhydrous lithium bromide and 10 cc. dimethyl formamide were admixed. About 2 cc. of the solvent were distilled off. Then 300 mg. of the 18,11-lactone of 4$\xi$-bromo-11$\beta$-hydroxy-5$\beta$-pregnane-3,20-dione-18-oic acid, V, were introduced into the mixture. The mixture was boiled for twenty minutes while distilling off 3 cc. The solution was then cooled, 25 cc. water were added. Then an excess of acetic acid was added, and the mixture was extracted with methylene chloride. The extract solutions, after washing with water and drying, were evaporated to dryness. Compound 18,11-lactone of 11$\beta$-hydroxy-$\Delta^4$-pregnene-3,20-dione-18-oic acid, VI was obtained which was crystallized from a mixture of ethyl acetate and ether (4:6), melting point 173° C. By recrystallization from a mixture of acetone and ether a product was obtained which melts at 174° C., specific rotation $[\alpha]_D^{20}=+167°\pm5°$ (c.=0.5%, chloroform). The star-like crystals of Compound VI were soluble in alcohol, acetone and chloroform, very slightly soluble in ether and insoluble in water and dilute aqueous acids or alkalis.

Analysis.—$C_{21}H_{26}O_4$=342.42. Calculated: C, 73.66%; H, 7.66%; O, 18.69%. Found: C, 73.5%; H, 7.5%; O, 19.1%.

The infra-red spectrum shows the presence of a $\gamma$-lactone group, a non-conjugated ketone group and a conjugated ketone group.

While we have set forth specific examples and preferred modes of practice of our invention, it will be understood that the invention is not limited to the embodiments of operation described above. More particularly, it is possible to employ equivalent techniques known to those skilled in the art, and to make various changes and modifications without departing from the spirit of the disclosure or the scope of the appended claims.

We claim:

1. A process for the preparation of the 18,11-lactone of 11$\beta$-hydroxy-$\Delta^4$-pregnene-3,20-dione-18-oic acid comprising the steps of oxidizing 3$\alpha$-acetoxy-18,20$\beta$-oxido-5$\beta$-pregnane-11-one with a sulfochromic mixture, treating said oxidized product with an alkali metal hydroxide to obtain 3$\alpha$-hydroxy-5$\beta$-pregnane-11,20-dione-18-oic acid, isolating said acid in the form of the hydroxy lactone isomer 20$\beta$,18-lactone of 3$\alpha$,20$\alpha$,20$\beta$,trihoxy-5$\beta$-pregnane-11-one-18-oic acid, IIB, reducing said lactone to the 18,11-lactone of 3$\alpha$,11$\beta$,20$\beta$-trihydroxy-5$\beta$-pregnane-18-oic acid with an alkali metal boron hydride, oxidizing the hydroxyl groups in the 3- and 20- positions with a chromic acid mixture to obtain the 18,11-lactone of 11$\beta$-hydroxy-5$\beta$-pregnane-3,20-dione-18-oic acid, and introducing a double bond in the 4,5 position, by brominating and dehydrobrominating said 18,11-lactone.

2. A process for the preparation of 18,11-lactone of 11$\beta$-hydroxy-$\Delta^4$-pregnene-3,20-dione-18-oic acid comprising the steps of oxidizing 3$\alpha$-acetoxy-18,20$\beta$-oxido-5$\beta$-pregnane-11-one with a mixture of chromic acid anhydride and sulfuric acid in an inert organic solvent, treating said oxidized product with sodium hydroxide to obtain 3$\alpha$-hydroxy-5$\beta$-pregnane-11,20-dione-18-oic acid, isolating said acid in the form of the hydroxy lactone 20$\beta$,18-lactone of 3$\alpha$,20$\alpha$,20$\beta$,trihydroxy-5$\beta$-pregnane-11-one-18-oic acid, IIB, reducing said lactone to the 18,11-lactone of 3$\alpha$,11$\beta$,20$\beta$-trihydroxy-5$\beta$-pregnane-18-oic acid with potassium borohydride in an inert organic solvent, oxidizing the hydroxyl groups in the 3- and 20- positions with chromic acid anhydride in acetic acid to obtain the 18,11-lactone of 11β-hydroxy-5β-pregnane-3,20-dione-18-oic acid, and introducing a double bond in the 4,5 position by brominating and dehydrobrominating the said 18,11-lactone.

3. The 18,11-lactone of 3α,11β-20β-trihydroxy-5β-pregnane-18-oic acid.

4. A compound having the formula:

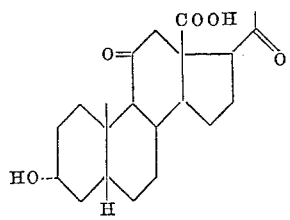

5. A compound having the formula:

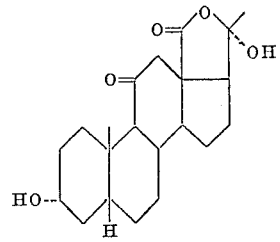

References Cited in the file of this patent
FOREIGN PATENTS 560,499    Canada _____ July 22, 1958

OTHER REFERENCES

Heusler et al.: Experientia, vol. 16, No. 1 (1960), pp. 21–24.

Djerassi: Optical Rotary Dispersion, 1960, McGraw-Hill Book Co., Inc., New York, pp. 1–293.